(12) United States Patent
Kiener et al.

(10) Patent No.: US 11,427,653 B2
(45) Date of Patent: Aug. 30, 2022

(54) CONTINUOUS METHOD FOR PRODUCING A DIENE ELASTOMER

(71) Applicant: COMPAGNIE GENERALE DES ETABLISSEMENTS MICHELIN, Clermont-Ferrand (FR)

(72) Inventors: Pierre Kiener, Clermont-Ferrand (FR); Leyla Pehlivan, Clermont-Ferrand (FR); Jean-Philippe Rasigade, Clermont-Ferrand (FR); Rokhiyatou Said-Diatta, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 87 days.

(21) Appl. No.: 16/767,731

(22) PCT Filed: Dec. 4, 2018

(86) PCT No.: PCT/FR2018/053100
§ 371 (c)(1),
(2) Date: May 28, 2020

(87) PCT Pub. No.: WO2019/110915
PCT Pub. Date: Jun. 13, 2019

(65) Prior Publication Data
US 2021/0380728 A1    Dec. 9, 2021

(30) Foreign Application Priority Data
Dec. 5, 2017    (FR) ...................................... 1761660

(51) Int. Cl.
*C08F 2/01* (2006.01)
*C08F 2/06* (2006.01)
(Continued)

(52) U.S. Cl.
CPC ................ *C08F 2/001* (2013.01); *C08F 2/06* (2013.01); *C08F 4/545* (2013.01); *C08F 36/06* (2013.01)

(58) Field of Classification Search
USPC ........................................................... 526/65
See application file for complete search history.

(56) References Cited

U.S. PATENT DOCUMENTS

| 6,372,863 B1 | 4/2002 | McDowell |
| 2002/0107339 A1* | 8/2002 | Knauf ..................... C08F 36/04 526/65 |

(Continued)

FOREIGN PATENT DOCUMENTS

| CN | 103360525 A | 10/2013 |
| RU | 2028308 C1 | 2/1995 |

(Continued)

OTHER PUBLICATIONS

International Search Report and Written Report for corresponding International Application No. PCT/FR2018/053100 dated Apr. 1, 2019.

(Continued)

*Primary Examiner* — Fred M Teskin
(74) *Attorney, Agent, or Firm* — Dickinson Wright PLLC

(57) ABSTRACT

A continuous method for producing a diene elastomer is provided. The method comprises a polymerization reaction of a catalytic system with at least one conjugated diene monomer to be polymerized in solution in a solvent. The catalytic system is based on at least a rare earth organic salt and an alkylating agent, in at least two full polymerization reactors in series. A portion of the conjugated diene monomer to be polymerized is introduced into a polymerization reactor subsequent to the first polymerization reactor.

20 Claims, 2 Drawing Sheets

(51) Int. Cl.
*C08F 4/54* (2006.01)
*C08F 36/06* (2006.01)
*C08F 2/00* (2006.01)

(56) References Cited

U.S. PATENT DOCUMENTS

| | | |
|---|---|---|
| 2004/0009870 A1 | 1/2004 | Laubry |
| 2005/0130835 A1 | 6/2005 | Laubry et al. |
| 2009/0182106 A1 | 7/2009 | Parola et al. |
| 2010/0041843 A1 | 2/2010 | Canivet et al. |
| 2013/0274407 A1 | 10/2013 | Cortial et al. |

FOREIGN PATENT DOCUMENTS

| | | |
|---|---|---|
| WO | 2002038636 A1 | 5/2002 |
| WO | 2003097708 A1 | 11/2003 |
| WO | 2006133757 A1 | 12/2006 |
| WO | 2007045417 A1 | 4/2007 |
| WO | 2010069511 A1 | 6/2010 |
| WO | 2010069805 A1 | 6/2010 |
| WO | 2010139449 A1 | 12/2010 |

OTHER PUBLICATIONS

International Search Report regarding PCT/FR2018/053100 dated Jun. 9, 2020.
Franck Vilmin; Fast and Robust Method for the Determination of Microstructure and Composition in Butadiene, Styrene-Butadiene, and Isoprene Rubber by Near-Infrared Spectroscopy, Society for Applied Spectroscopy, vol. 60, No. 6, 2006, pp. 619-630.

* cited by examiner

CONTINUOUS METHOD FOR PRODUCING A DIENE ELASTOMER

This application is a 371 national phase entry of PCT/FR2018/053100, filed on Dec. 4, 2018, which claims benefit of French Patent Application No. 1761660, filed Dec. 5, 2017, the entire contents of which are incorporated herein by reference for all purposes.

BACKGROUND

1. Field of the Invention

The present invention relates to a continuous method for producing a diene elastomer, such as a butadiene homopolymer or copolymer. The invention applies notably to the production of a polybutadiene with a high proportion of cis-1,4 chains having both a Mooney viscosity greater than or equal to 35 and a reduced polydispersity index.

Polymerization is carried out in solution. In solution polymerization, the reaction mixture comprises a solvent or a diluent. The reactor may then be filled with the polymerization solution (and thus lacks a gas phase) or may comprise a liquid phase and a gas phase. In the present invention, the polymerization reactions are carried out in solution in full reactors, i.e. substantially lacking a gas phase.

2. Related Art

For producing butadiene homopolymers or copolymers having a high proportion of cis-1,4 chains, it is known to use catalytic systems based on:
- a rare earth salt in solution in a hydrocarbon solvent,
- an alkylating agent of this salt consisting of an alkylaluminium, and
- an alkylaluminium halide.

The patent documents WO-A-02/38636 and WO-A-03/097708 in the applicants' name teach, for producing polybutadienes, the use of a catalytic system of the preformed type based on at least:
- a preforming conjugated diene,
- a salt of one or more rare earth metals of an organic phosphoric acid, in at least one inert, saturated hydrocarbon solvent of the aliphatic or alicyclic type,
- an alkylating agent consisting of an alkylaluminium of formula AlR3 or HAlR2, and
- a halogen donor that belongs to the class of the alkylaluminium halides but excluding the alkylaluminium sesquihalides.

The polybutadienes obtained by means of this catalytic system notably have a polydispersity index below 2.5 and a Mooney viscosity ML(1+4) at 100° C. greater than or equal to 40. This combination of characteristics makes these polybutadienes very suitable for use in tyre casing treads.

A continuous method for synthesis of polybutadiene is moreover also described in patent application EP 1 845 118, in the applicants' name.

The patent document WO-A-2010/139449 in the applicants' name describes another catalytic system for polymerization of conjugated dienes based on a rare earth metal salt and an organometallic compound based on a metal belonging to the 2nd or the 13th column of the periodic table.

In the continuous synthesis of polymers of conjugated dienes in full reactors, control of the temperature in the polymerization process with one or more reactors in series is decisive. For a given process, the range of operating conditions (specific flow rates and concentration of monomer(s)) is determined by the polymerization temperatures selected.

Thus, for full reactors without any cooling system, the amount of heat released by the production of polymer cannot exceed the amount of heat absorbed by the reaction mixture when it is heated from its initial temperature to the polymerization temperature. Now, the latter cannot be increased without altering the properties of the reaction mixture and/or of the catalyst.

This limitation must therefore be overcome by using a cooling system inside the reactor, such as a double jacket or internal cooling tube bundles.

The problem resulting from the presence of a double jacket or cooling tube bundles is that this equipment also has limits to its cooling capacity, which depends directly on the exchange surface area or on the temperature of the heat-transfer fluid and the properties of the polymer fluid within the reactor. The concentration of monomer and the conversion are therefore also limited.

To overcome these limitations, the applicants discovered that it was beneficial not to inject all of the monomer already in the first reactor, but to inject a portion thereof directly in a subsequent reactor. This injection makes it possible to provide a significant additional cooling capacity for all of the reactors while improving the conversion efficiency of each of the reactors.

In these conditions, the method according to the invention makes it possible to operate with a higher concentration by weight of conjugated diene monomer to be polymerized.

SUMMARY

The invention relates to a continuous method for producing a diene elastomer, comprising a polymerization reaction of a catalytic system with at least one conjugated diene monomer to be polymerized in solution in a solvent, the catalytic system being based on at least:
- a rare earth organic salt;
- an alkylating agent; and, if applicable
- a halogen donor and/or a preforming conjugated diene monomer in at least two full polymerization reactors in series, characterized in that a portion of the conjugated diene monomer to be polymerized is introduced into a polymerization reactor subsequent to the first polymerization reactor.

Advantageously, a portion of the solvent is also introduced with the conjugated diene monomer to be polymerized into the subsequent polymerization reactor.

Advantageously, at least 20 wt %, relative to the total weight, of the conjugated diene monomer to be polymerized is introduced into a subsequent polymerization reactor.

The portion of the conjugated diene monomer to be polymerized introduced into a subsequent polymerization reactor is advantageously at a temperature between −10° C. and 35° C., advantageously between 0° C. and 20° C.

In particular, the continuous method comprises the following simultaneous steps:
a) introducing, into a first polymerization reactor, the solvent, all of the catalytic system, a portion of the conjugated diene monomer to be polymerized;
b) polymerizing said diene monomer in said first polymerization reactor;
c) introducing, into a second polymerization reactor, the solution resulting from step b) and the remainder of the conjugated diene monomer to be polymerized;

d) polymerizing said diene monomer in said second polymerization reactor;

e) if applicable, introducing the solution resulting from step d) into a third polymerization reactor;

f) if applicable, polymerizing said diene monomer in said third polymerization reactor.

The polymerization in step b) is advantageously carried out at a temperature greater than or equal to 50° C.

The polymerization in step d) is advantageously carried out at a temperature greater than or equal to 50° C.

The polymerization in step f) is advantageously carried out at a temperature greater than or equal to 50° C.

The conjugated diene monomer to be polymerized and the solvent are advantageously introduced, into the first and/or subsequent polymerization reactor, at a temperature between −10° C. and 35° C., advantageously between 0° C. and 20° C.

In particular, the continuous method comprises the following simultaneous steps:

a1) separating the incoming stream F comprising the solvent and all of the conjugated diene monomer to be polymerized into two streams F1 and F2;

a2) introducing the catalytic system into a first polymerization reactor of stream F1;

b) polymerizing said diene monomer continuously in said first polymerization reactor;

c) injecting the solution resulting from step b) and stream F2 into a second reactor;

d) polymerizing said diene monomer continuously in said second polymerization reactor;

e) if applicable, injecting the solution resulting from step d) into a third reactor;

f) if applicable, polymerizing said diene monomer continuously in said third polymerization reactor.

Advantageously, at least stream F2 is at a temperature between −10° C. and 35° C., advantageously between 0° C. and 20° C.

The concentration by weight of conjugated diene monomer to be polymerized is advantageously above 20%, relative to the total weight of conjugated diene monomer to be polymerized+solvent.

The diene monomer to be polymerized is advantageously butadiene.

Figure 1:
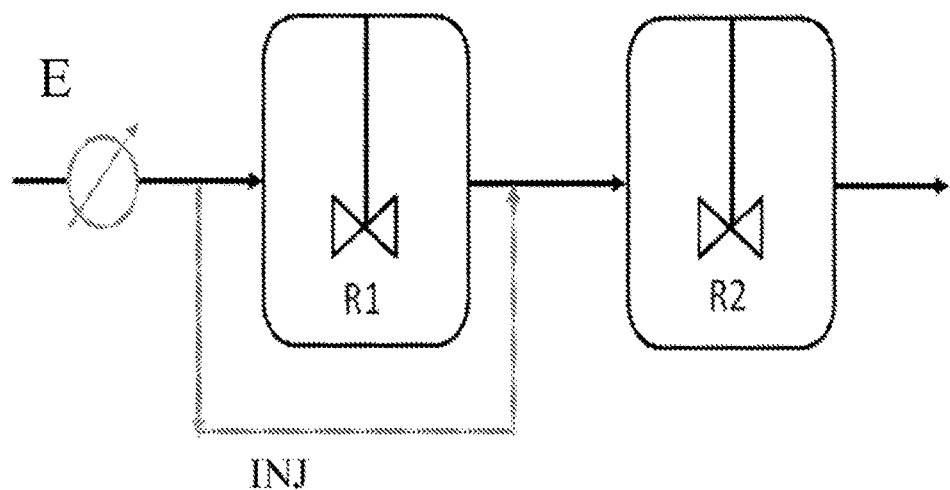
FIGS. 1, 2 and 3 show two polymerization reactors in series. The first polymerization reactor is designated R1. The second polymerization reactor is designated R2.

In the particular embodiment shown in FIG. 1, the incoming stream comprising the solvent and the conjugated diene monomer to be polymerized is separated into two streams:
one feeding polymerization reactor R1;
the other feeding polymerization reactor R2 (INJ=injection).

In this embodiment, an exchanger E is mounted upstream of polymerization reactor R1. It is possible, at the level of this exchanger, to lower the temperature of the stream comprising the solvent and the conjugated diene monomer to be polymerized.

Figure 2:
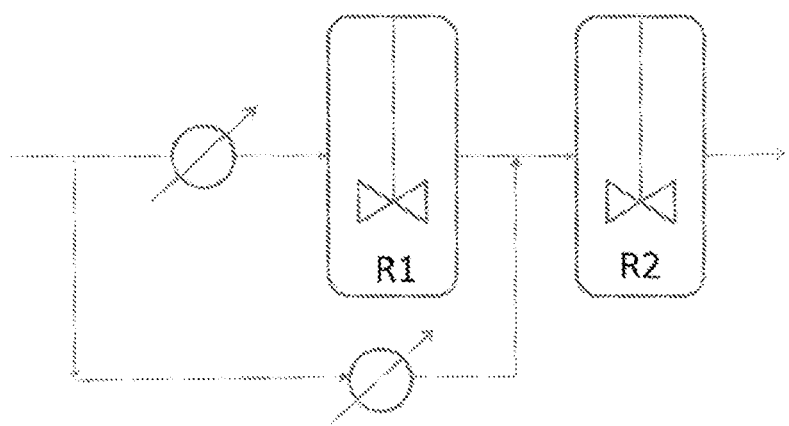

In the particular embodiment shown in FIG. 2, the incoming stream comprising the solvent and the conjugated diene monomer to be polymerized is separated into two streams. In this embodiment, an exchanger is mounted upstream of polymerization reactor R1, making it possible to lower the temperature of the stream comprising the solvent and the conjugated diene monomer to be polymerized entering R1.

An exchanger is also mounted upstream of polymerization reactor R2, making it possible to lower the temperature of the stream comprising the solvent and the conjugated diene monomer to be polymerized entering R2. In the particular embodiment shown in FIG. 3, the incoming stream comprising the solvent and the conjugated diene monomer to be polymerized is cooled (exchanger) and then separated into two streams. The temperature of the stream feeding polymerization reactor R2 is also controlled, and optionally lowered.

Figure 3:
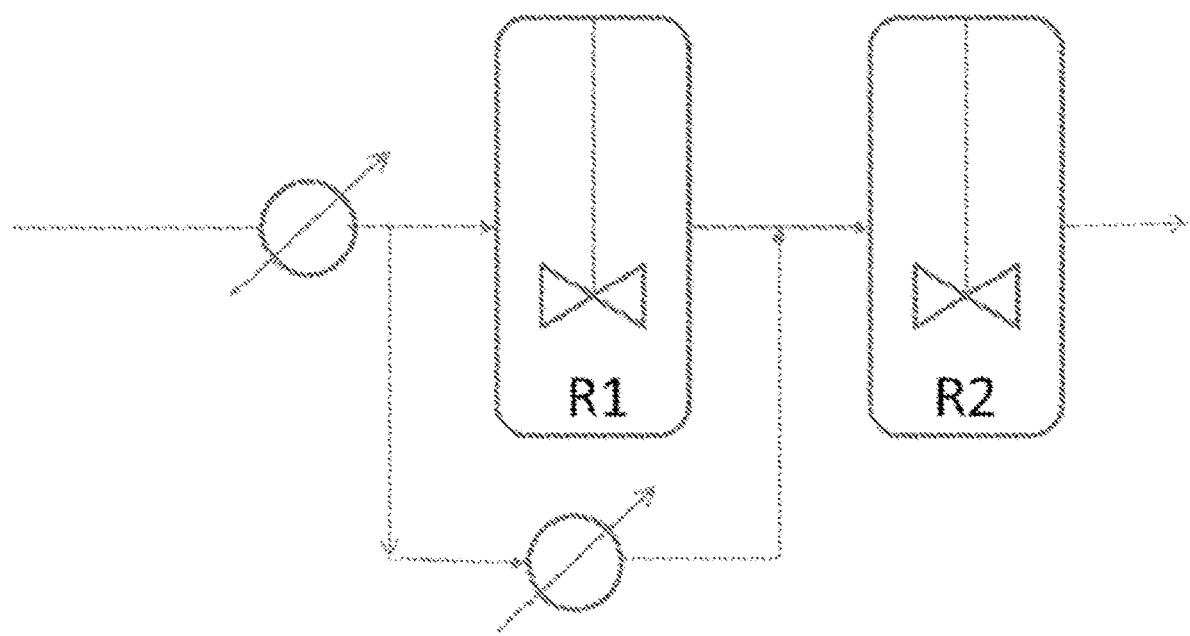

The streams for feed of catalytic system as well as the optional cooling systems of the polymerization reactors are not shown in FIG. 1, 2 or 3.

DETAILED DESCRIPTION OF EXAMPLE EMBODIMENTS

The present invention relates to a continuous method for producing a diene elastomer, comprising a polymerization reaction of a catalytic system with at least one conjugated diene monomer to be polymerized in solution in a solvent, the catalytic system is based on at least:
a rare earth organic salt;
an alkylating agent; and, if applicable
a halogen donor and/or a preforming conjugated diene monomer
in at least two full polymerization reactors in series, characterized in that a portion of the conjugated diene monomer to be polymerized is introduced into a polymerization reactor subsequent to the first polymerization reactor.

In the sense of the present invention, "polymerization reactor" means a reactor comprising conjugated diene monomer to be polymerized, solvent, the catalytic system and diene elastomer in the course of formation. These components make up the reaction mixture. In the context of the invention, this polymerization reactor is full, i.e. it is filled with the reaction mixture, and thus substantially lacks a gas phase.

In the sense of the present invention, "first polymerization reactor" means the reactor into which monomer, solvent and the catalytic system are injected for initiating the polymerization reaction. No solution or stream comprising diene elastomer received from an upstream polymerization reactor is injected into this first polymerization reactor. In fact, the polymerization reaction begins in this first reactor.

In the sense of the present invention, "subsequent polymerization reactor" or "downstream polymerization reactor" means a polymerization reactor fed by the stream leaving the polymerization reactor that precedes it. Said stream comprises diene elastomer, besides the conjugated diene monomer to be polymerized. A subsequent or downstream polymerization reactor of this kind is positioned after another polymerization reactor, i.e. downstream of this other polymerization reactor.

In the sense of the present invention, "temperature of the polymerization reactor" means the temperature inside the reactor.

In the sense of the present invention, "cooling tube bundle" means one or more elements, most often tubular, passing through the polymerization reactor, in which a cooling fluid or a heat-transfer fluid flows.

In the sense of the present invention, "concentration by weight of conjugated diene monomer to be polymerized" means the sum of the concentrations of monomers introduced into all of the reactors.

In the sense of the present invention, the expression "the monomer," "monomer" denotes either a single monomer for forming a homopolymer or monomers that will copolymerize together to form a copolymer.

The invention is therefore characterized in that the conjugated diene monomer to be polymerized is introduced into at least two polymerization reactors in series: a first polymerization reactor and at least one subsequent polymerization reactor. Thus, a portion of the conjugated diene monomer to be polymerized is introduced into a reactor comprising said diene elastomer in solution.

The temperature of the polymerization reactor is advantageously greater than or equal to 50° C., more advantageously greater than or equal to 70° C., even more advantageously greater than or equal to 80° C. The temperature of the polymerization reactor is advantageously below 115° C.

The temperature of the downstream polymerization reactor may advantageously be above that of the upstream polymerization reactor.

The polymerization reactors are advantageously equipped with stirring means, such as propellers or blades suitable for the polymerization medium.

The polymerization reactors are advantageously equipped with cooling means, such as double jackets and/or cooling tube bundles.

In one embodiment, a portion of the solvent is introduced with the conjugated diene monomer to be polymerized into the subsequent polymerization reactor.

According to the invention, advantageously at least 20 wt %, more advantageously at least 30 wt %, for example from 30 to 60 wt %, relative to the total weight, of the conjugated diene monomer to be polymerized is introduced into a subsequent polymerization reactor.

In an advantageous embodiment, the conjugated diene monomer to be polymerized and the solvent are introduced, into the first and/or subsequent polymerization reactor, at a temperature between −10° C. and 35° C., advantageously between 0° C. and 20° C. In fact, in addition it was found that when the temperature of the streams of conjugated diene monomer to be polymerized and of solvent is lowered before introducing these streams into the polymerization reactor, the maximum concentration by weight of conjugated diene monomer to be polymerized could be increased further.

In a preferred embodiment, the whole of the catalytic system is introduced into the first polymerization reactor.

The continuous method advantageously comprises the following simultaneous steps:
a) introducing, into a first polymerization reactor, the solvent, all of the catalytic system, a portion of the conjugated diene monomer to be polymerized;
b) polymerizing said diene monomer in said first polymerization reactor;
c) introducing, into a second polymerization reactor, the solution resulting from step b) and the remainder of the conjugated diene monomer to be polymerized;
d) polymerizing said diene monomer in said second polymerization reactor;
e) if applicable, introducing the solution resulting from step d) into a third polymerization reactor;
f) if applicable, polymerizing said diene monomer in said third polymerization reactor.

The polymerization may be a homopolymerization or a copolymerization, depending on the monomer, which may be a single monomer or a mixture of monomers, advantageously a single monomer. In the case of a copolymerization, the different monomers are all introduced into the different reactors according to the method of the present invention, i.e. for each monomer, a portion of this monomer is introduced into a polymerization reactor subsequent to the first polymerization reactor.

The polymerization in step b) is advantageously carried out at a temperature greater than or equal to 50° C., more advantageously greater than or equal to 70° C.

The polymerization in step d) is advantageously carried out at a temperature greater than or equal to 50° C., more advantageously greater than or equal to 70° C.

The polymerization in step f) is advantageously carried out at a temperature greater than or equal to 50° C., more advantageously greater than or equal to 70° C.

The third polymerization reactor makes it possible to increase the degree of conversion and thus attain particularly high degrees of conversion, typically above 90%, advantageously above 95%, even more advantageously above 98%.

The continuous method according to the invention advantageously comprises the following simultaneous steps:
a1) separating the incoming stream F comprising the solvent and all of the conjugated diene monomer to be polymerized into two streams F1 and F2;
a2) introducing the catalytic system into a first polymerization reactor of stream F1;
b) polymerizing said diene monomer continuously in said first polymerization reactor;
c) injecting the solution resulting from step b) and stream F2 into a second reactor;
d) polymerizing said diene monomer continuously in said second polymerization reactor;
e) if applicable, injecting the solution resulting from step d) into a third reactor;
f) if applicable, polymerizing said diene monomer continuously in said third polymerization reactor.

Advantageously, the temperature of the incoming stream comprising the solvent and the conjugated diene monomer to be polymerized is adjusted to a temperature between −10° C. and 35° C. and particularly between 0° C. and 20° C.

This adjustment of the temperature may be carried out:
directly on stream F, so that streams F1 and F2 introduced in steps a2) and c) are at a temperature between −10° C. and 35° C., advantageously between 0° C. and 20° C.;
on stream F1 and/or on stream F2.

Advantageously at least stream F2 is at a temperature between −10° C. and 35° C., advantageously between 0° C. and 20° C.

The method according to the invention makes it possible to increase the concentration by weight of conjugated diene monomer to be polymerized. According to the invention, the concentration by weight of conjugated diene monomer to be polymerized is advantageously above 10%, more advantageously above 14%, even more advantageously above 20%, by weight relative to the total weight of conjugated diene monomer to be polymerized+solvent.

By allowing operation at higher concentration by weight of conjugated diene monomer to be polymerized, the method according to the invention makes it possible to lower the operating cost of the process by avoiding solvent evaporation. Thus, a process at a concentration by weight of conjugated diene monomer to be polymerized of 17% necessitates evaporating 4.9 tonnes of solvent, whereas a process for which the weight ratio [conjugated diene monomer to be polymerized]/[solvent] is 25% only requires extracting 3 tonnes of solvent. The saving of 1.9 tonne of solvent per tonne of diene elastomer is substantial.

At the outlet of the last reactor, the degree of conversion of the diene elastomer is advantageously greater than 90%, more advantageously greater than 95%, even more advantageously greater than 98%.

The applicants also discovered, unexpectedly, that the properties of the diene elastomer produced remain unchanged in these different conditions. In particular, polybutadienes can be obtained having a polydispersity index below 2.5 and a Mooney viscosity ML(1+4) at 100° C. greater than or equal to 40.

Diene Monomer to be Polymerized

According to the method of the invention, at least one conjugated diene monomer is polymerized.

Conjugated diene monomer means a conjugated diene monomer having from 4 to 16 carbon atoms. Suitable conjugated dienes are notably butadiene-1,3, 2-methyl-1,3-butadiene (also called isoprene), 2,3-di($C_1$ to $C_5$ alkyl)-1,3-butadiene such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, myrcene, and mixtures thereof.

Advantageously, the diene monomer to be polymerized is selected from butadiene, isoprene or mixtures thereof, more advantageously the diene monomer to be polymerized is butadiene. According to implementations of the method of the invention, the conjugated diene monomer may be copolymerized with one or more conjugated diene monomers.

Catalytic System

The catalytic system is prepared on the basis of at least:
a rare earth organic salt,
an alkylating agent
and, if applicable,
a halogen donor and/or
a preforming conjugated diene monomer.

The expression "on the basis of" used for defining the constituents of the catalytic system means the product or products of reaction of these constituents after premixing some or all of the constituents, or, if applicable, after preforming and/or ageing of the catalytic system or else the product or products of reaction of these constituents in situ.

The catalytic system may be prepared in batch mode or continuously. According to one implementation of the method of the invention, upstream of the polymerization reactor, an installation for continuous synthesis of the catalytic system supplies the first polymerization reactor continuously. The catalytic system may be introduced into the reactor directly or may be mixed beforehand with at least one of the other components fed to the first polymerization reactor.

According to the invention, "rare earth" means a metal selected from yttrium, scandium and the lanthanides, metals having an atomic number from 57 to 71 in Mendeleev's periodic table of the elements. Preferably the rare earth metal is selected from the lanthanides, neodymium being more particularly preferred.

"Organic salt of a rare earth metal" means for example the tris(carboxylates), tris(alcoholates), tris(acetylacetonates) or tris(organophosphates) of rare earths.

When the rare earth organic salt is a rare earth tris (carboxylate), the carbon/late may be selected from the esters of aliphatic carboxylic acids, linear or branched, having 6 to 16 carbon atoms in the linear chain, and the esters of aromatic carboxylic acids comprising between 6 and 12 carbon atoms, substituted or unsubstituted. As examples, we may mention neodecanoate (versatate), octoate, hexanoate, linear or branched, or else naphthenate, substituted or unsubstituted. Among the latter, the rare earth 2-ethylhexanoate, naphthenate or neodecanoate (versatate) is particularly preferred. When the rare earth organic salt is a rare earth tris(alcoholate), the alcoholate may be selected from the alcoholates of an alcohol or of a polyol derived from an aliphatic or cyclic hydrocarbon and notably from an aliphatic hydrocarbon, linear or branched, having 1 to 10 carbon atoms in the linear chain, more particularly 4 to 8 carbon atoms. We may mention for example neo-pentanolate.

When the rare earth organic salt is a rare earth tris (organophosphate), the organophosphate may be selected from the diesters of phosphoric acid of general formula (R'O)(R"O)PO(OH), in which R' and R", which may be identical or different, represent an alkyl, aryl or alkylaryl radical. As examples we may mention the use of neodymium tris[dibutylphosphate], neodymium tris[dipentylphosphate], neodymium tris[dioctylphosphate], neodymium tris[bis(2 ethylhexyl)phosphate], neodymium tris[bis(1-methylheptyl) phosphate], neodymium tris[bis(p-nonylphenyl)phosphate], neodymium tris[butyl(2-ethylhexyl)phosphate], neodymium tris[(1-methylheptyl) (2-ethylhexyl) phosphate], neodymium tris[(2-ethylhexyl) (p-nonylphenyl)phosphate], neodymium tris[bis(2-ethylhexyl) phosphate], tris[bis(oleyllyl) phosphate] or tris[bis(lineolyl) phosphate]. Among the rare earth organophosphates, the salt is even more preferably a rare earth bis(2-ethylhexyl)phosphate.

The rare earth organic salt is preferably selected from neodymium tris[bis(2-ethylhexyl)phosphate] and neodymium tris(versatate).

The rare earth salt is dissolved or suspended, depending on circumstances, conventionally in an inert hydrocarbon solvent selected for example from the aliphatic or alicyclic solvents of low molecular weight such as cyclohexane, methylcyclohexane, a hexane cut, n-heptane, or a mixture of these solvents.

As alkylating agent usable in the catalytic system according to the invention, we may mention alkylaluminiums selected from trialkylaluminiums, or dialkylaluminium hydrides, the alkyl group comprising from 1 to 10 carbon atoms. As tri(alkylaluminium), we may mention triethylaluminium, tri-isopropylaluminium, tri-isobutylaluminium, tributylaluminium or trioctylaluminium. Among the alkylaluminiums, triisobutylaluminium or diisobutylaluminium hydride is preferred.

As alkylating agent usable in the catalytic system according to the invention, we may also mention the aluminoxanes, compounds resulting from the partial hydrolysis of one or more trialkylaluminium, such as methylaluminoxane, tri-isobutylaluminoxane or the methylaluminoxanes.

When the catalytic system comprises a halogen donor, an alkyl halide, an alkylaluminium halide or an alkylaluminium sesquihalide may be used. An alkylaluminium halide, with the alkyl group comprising from 1 to 8 carbon atoms, is preferably used. Among the latter, diethylaluminium chloride is preferred.

According to one embodiment, the catalytic system is made up using a combination of diisobutylaluminium hydride and diethylaluminium chloride as alkylating agent and halogen donor, respectively.

According to a particular feature of the catalytic system, the rare earth metal or metals are present in the catalytic system at a concentration greater than or equal to 0.002 mol/l, and preferably from 0.002 to 0.1 mol/l and more particularly from 0.010 mol/l to 0.08 mol/l, or even from 0.02 to 0.07 mol/l.

According to another particular feature of the catalytic system, the molar ratio (alkylating agent/rare earth salt(s)) in said catalytic system has a value of at least 1/1 and of at most 20/1, and, even more advantageously, of at most 5/1.

According to yet another particular feature of the catalytic system, the molar ratio (halogen donor/rare earth salt) may have a value of at least 2/1, preferably of at least 2.6/1, and of at most 3.5/1, preferably at most 3/1.

When the catalytic system comprises a preforming conjugated diene monomer used for "preforming" said catalytic system, the latter may be selected from the conjugated diene monomers mentioned above. 1,3-butadiene or isoprene are particularly preferred.

It should be noted that the molar ratio (preforming monomer/rare earth salt(s)) may have a value from 10/1 to 70/1, preferably 25/1 to 50/1.

As the catalytic system, whether or not preformed, in the context of the present invention it is possible to use those described in documents WO-A-02/38636, WO-A-03/097708 and WO-A-2007045417 in the applicants' name.

According to embodiment variants of the catalytic polymerization process according to the invention, we may introduce into the polymerization reactor, via a stream independent of the introduction of the catalytic system used for the polymerization reaction, a predetermined additional amount of at least one alkylaluminium compound of formulae AlR3 or HAlR2 or R"nAlR'3-n, in which R and R' represent an alkyl group with 1 to 20 carbon atoms, saturated or unsaturated, preferably with 1 to 12 carbon atoms, R" represents an allyl group, and n is an integer from 1 to 3 inclusive. Variants of this kind are described notably in documents WO2006133757, EP 1845118, WO 10/069511, WO10/069805.

Solvent

The polymerization solvent is advantageously an inert hydrocarbon solvent, preferably aliphatic or alicyclic of low molecular weight. We may mention as examples the paraffins, such as n-pentane, isopentane, 2,2-dimethylbutane, 2,2-dimethylpropane (neopentane), a pentane cut, n-hexane, a hexane cut, n-heptane, a heptane cut, n-octane, iso-octane, an octane cut, olefins such as 1-pentene, the isoamylenes (2-methyl-2-butene, 2-methyl-1-butene and 3-methyl-1-butene), the cycloparaffins such as cyclopentane, cyclohexane, methylcyclopentane and methylcyclohexane, as well as mixtures of these compounds. The aromatic hydrocarbons, for example such as benzene or toluene, may also be mentioned as solvent.

The solvent may be introduced into the reactor directly. It may also be mixed beforehand with at least one other of the components introduced into the polymerization reactor, notably with the monomer(s) to be polymerized. The latter option constitutes a preferential implementation of the invention.

Diene Elastomer

The elastomers obtained according to the method of the invention are advantageously stereospecific and advantageously have a content of cis-1,4 bonds greater than or equal to 94%. These elastomers advantageously have a polydispersity index PDI that is below 3.2 and, more advantageously, less than or equal to 2.5.

It should further be noted that the elastomers obtained by the method according to the invention display reduced cold flow, without applying a post-polymerization reaction of the "jumping" type using halogen compounds, whether or not containing sulphur. This reduced cold flow reflects the reduced capacity of the elastomers to flow under load. This situation is encountered for example when samples or "bales" of these elastomers are stacked on one another in storage boxes. The cold flow calculated by the method presented hereunder is typically below 0.5 g and more advantageously below 0.3 g and greater than or equal to 0.01 g.

Especially preferably, said diene elastomer is selected from the group of highly unsaturated diene elastomers consisting of polybutadienes (BR), synthetic polyisoprenes (IR), butadiene copolymers and isoprene copolymers.

The diene elastomer obtained by the polymerization process according to the invention is advantageously characterized by a high level of cis-1,4 chains, and it may for example consist of a polyisoprene (IR), a polybutadiene (BR), an isoprene copolymer or a butadiene copolymer.

The method according to the invention makes it possible to obtain polybutadienes having an intrinsic viscosity, measured at 25° C. and at a concentration of 0.1 g/dl in toluene, which is above 2 dl/g (this intrinsic viscosity being measured according to standard ASTM D 1646).

The method according to the invention also makes it possible to obtain polybutadienes having high levels of cis-1,4 chains, and in particular the polybutadienes may have levels of cis-1,4 chains, measured by the near infrared (NIR) assay technique, which may be above 90%, advantageously above 94%, more advantageously between 96.0% and 99.0%.

The polybutadienes obtained advantageously have a polydispersity index below 2.5 (measured by the technique of size exclusion chromatography SEC), more advantageously below 2.3.

The polybutadienes obtained advantageously have a Mooney viscosity ML(1+4) at 100° C., 2 rev/min advantageously greater than or equal to 35, more advantageously greater than or equal to 40.

The polybutadienes obtained advantageously have reduced cold flow, preferably below 0.3, as characterized by measuring Cold Flow (1+6, 100° C.).

These polybutadienes are particularly suitable for use in tyre casing treads.

The method according to the invention also makes it possible to obtain polyisoprenes having high levels of cis-1,4 chains, and in particular the polyisoprenes may have levels of cis-1,4 chains, measured by the near infrared (NIR) assay technique, which may be above 90%, advantageously above 94%.

The polyisoprenes obtained advantageously have a polydispersity index below 2.3.

The polyisoprenes obtained advantageously have a Mooney viscosity ML (1+4) at 100° C. that may be in a relatively wide range of values, of the order of from 40 to 100.

These polyisoprenes are particularly suitable for use in tyre casing treads.

The protocols for measurement of these various properties are defined in the introduction of the examples.

EXAMPLES

Measurements Used

Size Exclusion Chromatography

The SEC (Size Exclusion Chromatography) technique makes it possible to separate macromolecules in solution according to their size through columns filled with a porous gel. The macromolecules are separated according to their hydrodynamic volume, the most voluminous being eluted first.

Without being an absolute method, SEC makes it possible to gain an idea of the molecular weight distribution of a polymer. On the basis of commercial standards, the different number-average (Mn) and weight-average (Mw) molecular weights can be determined and the polydispersity index (PDI=Mw/Mn) can be calculated via a so-called MOORE calibration.

There is no particular treatment of the polymer sample before analysis. It is simply dissolved in the elution solvent at a concentration of about 1 g·L$^{-1}$. Then the solution is filtered on a filter with a porosity of 0.45 μm before injection.

The equipment used is a "WATERS alliance" chromatography chain. The elution solvent is either tetrahydrofuran, or tetrahydrofuran+1 vol % of diisopropylamine+1 vol % of triethylamine, with a flow rate of 1 mL·min$^{-1}$, a system temperature of 35° C. and analysis time of 30 min. A set of two WATERS columns with the trade name "STYRAGEL HT6E" is used. The volume of the solution of the polymer sample injected is 100 μL. The detector is a "WATERS 2410" differential refractometer and the software for processing the chromatographic data is the "WATERS EMPOWER" system.

The average molecular weights calculated are relative to a calibration curve obtained for polybutadienes with the following microstructure: 99 wt % of 1-4 cis type units.

Mooney Viscosity

For polymers and rubber compounds, the Mooney viscosities ML(1+4) 100° C. are measured according to standard ASTM D 1646 (December 2015).

An oscillating consistometer is used, as described in standard ASTM D 1646. Mooney plasticity is measured according to the following principle: the elastomer or the crude composition (i.e. before baking) is moulded in a cylindrical container heated to 100° C. After preheating for one minute, the rotor rotates within the test specimen at 2 rev/min and the useful torque for maintaining this movement after 4 minutes of rotation is measured. The Mooney plasticity ML(1+4) is expressed in "Mooney units" (UM, with 1 UM=0.83 N·m).

The difference between the Mooney viscosity of the composition and the Mooney viscosity of the elastomer makes it possible to measure the processability or processing in the raw state. The smaller this difference, the better the processing in the raw state.

Differential Calorimetry

The glass transition temperatures (Tg) of the elastomers are determined using a differential scanning calorimeter with a scanning rate of 20° C./min.

Near Infrared Spectroscopy (NIR)

The microstructure of the elastomers is characterized by the technique of near infrared spectroscopy (NIR).

Near infrared spectroscopy (NIR) is used for quantitative determination of the proportion of styrene by weight in the elastomer as well as its microstructure (relative distribution of the butadiene 1,2, 1,4-trans and 1,4-cis units). The principle of the method is based on the Beer-Lambert law generalized for a multicomponent system. As the method is indirect, it makes use of a multivariate calibration [Vilmin, F.; Dussap, C.; Coste, N. Applied Spectroscopy 2006, 60, 619-29] carried out using standard elastomers of composition determined by $^{13}$C NMR. The microstructure is then calculated from the NIR spectrum of an elastomer film about 730 μm thick. The spectrum is acquired in transmission mode between 4000 and 6200 cm$^{-1}$ with a resolution of 2 cm$^{-1}$, using a Bruker Tensor 37 Fourier transform near infrared spectrometer equipped with an InGaAs detector cooled by the Peltier effect.

Intrinsic Viscosity

The intrinsic viscosity of the elastomers at 25° C. is determined from an elastomer solution at 0.1 g·dL$^{-1}$ in toluene, according to the following principle: The intrinsic viscosity is determined by measuring the flow time t of the polymer solution and the flow time $t_0$ of toluene, in a capillary tube.

In a Ubbelohde tube (diameter of the capillary 0.46 mm, capacity 18 to 22 mL), placed in a thermostatically controlled bath at 25±0.1° C., the flow times of toluene and of the polymer solution at 0.1 g·dL$^{-1}$ are measured.

The intrinsic viscosity is obtained from the following relation:

$$\eta_{inh} = \frac{1}{C}\ln\left[\frac{(t)}{(t_0)}\right]$$

with:
C: concentration of the polymer solution in toluene in g·dL$^{-1}$,
t: flow time of the polymer solution in toluene in seconds,
$t_0$: flow time of toluene in seconds,
$\eta_{inh}$: intrinsic viscosity expressed in dL·g$^{-1}$.

Cold Flow

It is a matter of measuring the weight of elastomer extruded through a calibrated die in a given time (6 hours) and in fixed conditions (T=100° C.). The die has a diameter of 6.35 mm, a thickness of 0.5 mm and is located at bottom centre of a hollowed cylindrical cup with a diameter of 52 mm.

This device is charged with 40±4 g of elastomer previously formed into a tablet (2 cm thick and 52 mm in diameter). A calibrated piston of 1 kg (±5 g) is positioned on the elastomer tablet. The whole is then put in a stove at 100±0.5° C.

As the conditions have not stabilized in the first hour in the stove, the product extruded at t=1 hour is cut off and discarded.

Measurement is then continued for 6 hours±5 min, during which the product is left in the stove. At the end of the 6 hours, the sample of extruded product is cut off and weighed. The result of the measurement is the weight of elastomer weighed, expressed in g, and is designated CF(1+6) 100° C. The lower this result, the more the elastomer resists cold flow.

Preparation of the Polymerization Catalyst

The catalytic system was prepared by the method according to the invention described in patent application WO2007/045417 and shown schematically in FIG. 1 of this patent application.

The dynamic mixers intended for the steps of alkylation and halogenation/ageing have respective volumes of 0.491 and 2.781. The flow rate of the installation is 2.34 l/h. This method was used for preparing the catalytic system that has the catalyst formula in molar ratio Nd/butadiene/DIBAH/CDEA=1/30/3/2.8 and a neodymium concentration of 0.044 mol/L.

DIBAH=diisobutylaluminium hydride
CDEA=diethylaluminium chloride

More precisely, this catalytic system was prepared using a solution of neodymium phosphate salt (NdP3) in MCH (methylcyclohexane) maintained at 30° C. and carrying out:

in a first dynamic mixer, addition of the preforming diene to this solution, in the next dynamic mixer, alkylation of the mixture thus obtained, maintained at 30° C., by means of DIBAH for 15 min, the concentration of DIBAH used being 1 mol/L; and then in the next dynamic mixer, halogenation and ageing of the alkylation reaction product by means of CDEA at 60° C., for 70 min. The concentration of CDEA used is 0.785 mol/L.

This catalyst is the catalyst used in all the examples that follow.

Example 1: Synthesis of Polybutadiene with the Catalyst and an Initial Concentration of Monomer by Weight of 10.8% and Comparison of the Properties of the Polymer Comparative Example 1COMPAR Polymerization of the butadiene is carried out by a continuous polymerization process with 2 or 3 reactors of identical volume (14 L) arranged in series and each provided with a double jacket for cooling, the temperature of which is adjustable for controlling the polymerization temperature.

A mixture of methylcyclohexane (polymerization solvent), butadiene in a proportion of 10.8% relative to the total amount of butadiene and solvent, and the catalyst are injected in the first polymerization reactor. The amount of neodymium injected is expressed in μmol per 100 g of butadiene monomer, which is designated "μmcm".

The second reactor is fed exclusively with the mixture leaving the first reactor. Similarly, the third reactor, when present, is fed exclusively with the mixture leaving the second reactor. The residence time, calculated assuming a constant density of 762 kg/m$^3$ in each of the reactors, is 12.6 min. When there are two reactors, the polymerization temperature in the first reactor is 90° C., and it is 95° C. in the second reactor. When there are three reactors, the polymerization temperature in the first reactor is 90° C., and it is 95° C. in the second reactor and 98° C. in the last reactor. The characteristics of the polybutadiene obtained at the outlet of the last reactor are reported in Table 1.

Example According to the Invention 1INV

Polymerization of butadiene is carried out using a continuous polymerization process with 2 or 3 reactors of identical volume (14 L) arranged in series and each provided with a double jacket for cooling, the temperature of which is adjustable for controlling the polymerization temperature.

The mixture of methylcyclohexane (polymerization solvent) and butadiene has a proportion of butadiene of 10.8% relative to the total amount of butadiene and solvent.

A first portion of this mixture is injected in the first polymerization reactor with the catalyst and if applicable additional DIBAH.

The other portion of the mixture of methylcyclohexane and butadiene is injected in the second polymerization reactor.

Thus, the second reactor is fed with this other portion of the mixture of methylcyclohexane and butadiene and with the mixture leaving the first reactor.

The weight ratio of the stream (solvent+butadiene) injected in the first reactor to the stream (solvent+butadiene) injected in the second reactor is 74%/26%.

The third reactor, when present, is fed exclusively with the mixture leaving the second reactor.

The residence time, calculated assuming a constant density of 762 kg/m$^3$ in the second reactor, is 12.6 min. When there are two reactors, the polymerization temperature in the first reactor is 90° C., and it is 95° C. in the second reactor. When there are three reactors, the polymerization temperature in the first reactor is 90° C., and it is 95° C. in the second reactor and 98° C. in the last reactor. The characteristics of the polybutadiene obtained at the outlet of the last reactor are reported in Table 1.

TABLE 1

| | POLYMERIZATION | | | CHARACTERISTICS OF THE POLYBUTADIENE OBTAINED | | | | | |
|---|---|---|---|---|---|---|---|---|---|
| | Nd (μmcm) | Additional DIBAH (μmcm) | Number of reactors | ML (1 + 4) | Mn | PDI | Cis (%) | Intrinsic viscosity (dL/g) | Cold Flow (g) |
| 1COMPAR | 400 | 0 | 3 | 46 | 206343 | 1.91 | 95.7% | 2.59 | 0.45 |
| | | 0 | 2 | 39 | 207568 | 1.87 | 96.0% | 2.47 | 0.71 |
| 1INV | | 92 | 3 | 42 | 203049 | 1.91 | 95.2% | 2.51 | 0.43 |
| | | 0 | 2 | 40 | 178760 | 1.99 | 95.9% | 2.51 | 0.65 |

Examination of Table 1 clearly shows that, for one and the same number of reactors, the conventional process (1COMPAR) and the process with reinjection (1INV) allow synthesis of polybutadienes, which, for an equivalent Mooney value, have equivalent structural properties (PDI, % cis) and equivalent flow properties (cold flow).

Example 2: Synthesis of Polybutadiene with the Catalyst and an Initial Concentration of Monomer by Weight of 14.9% and Comparison of the Properties of the Polymer Comparative Example 2COMPAR Polymerization of butadiene is carried out using a continuous polymerization process with 2 or 3 reactors of identical volume (14 L) arranged in series and each provided with a double jacket for cooling, the temperature of which is adjustable for controlling the polymerization temperature.

A mixture of methylcyclohexane (polymerization solvent), butadiene in a proportion of 14.9% relative to the total amount of butadiene and solvent, catalyst and additional DIBAH are injected in the first polymerization reactor. The amount of neodymium injected is expressed in μmol per 100 g of butadiene monomer, which is designated "μmcm". The second reactor is fed exclusively with the mixture leaving the first reactor. Similarly, the third reactor, when present, is fed exclusively with the mixture leaving the second reactor.

The residence time, calculated assuming a constant density of 762 kg/m$^3$ in each of the reactors, is 20.5 min. When there are two reactors, the polymerization temperature in the first reactor is 90° C., and it is 95° C. in the second reactor. When there are three reactors, the polymerization temperature in the first reactor is 90° C., and it is 95° C. in the second reactor and 98° C. in the last reactor. Conversion is above 98%. The characteristics of the polybutadiene obtained at the outlet of the last reactor are reported in Table 2.

Example According to the Invention 2INV

Polymerization of butadiene is carried out using a continuous polymerization process with 2 or 3 reactors of identical volume (14 L) arranged in series and each provided with a double jacket for cooling, the temperature of which is adjustable for controlling the polymerization temperature.

The mixture of methylcyclohexane (polymerization solvent) and butadiene has a proportion of butadiene of 14.9% relative to the total amount of butadiene and solvent.

A first portion of this mixture is injected in the first polymerization reactor with the catalyst and if applicable additional DIBAH.

The other portion of the mixture of methylcyclohexane and butadiene is injected in the second polymerization reactor.

Thus, the second reactor is fed with this other portion of the mixture of methylcyclohexane and butadiene and with the mixture leaving the first reactor.

The weight ratio of the stream (solvent+butadiene) injected in the first reactor to the stream (solvent+butadiene) injected in the second reactor is 74%/26%.

The third reactor, when present, is fed exclusively with the mixture leaving the second reactor.

The residence time, calculated assuming a constant density of 762 kg/m$^3$ in the second reactor, is 20.5 min. When there are two reactors, the polymerization temperature in the first reactor is 90° C., and it is 95° C. in the second reactor. When there are three reactors, the polymerization temperature in the first reactor is 90° C., and it is 95° C. in the second reactor and 98° C. in the last reactor. Conversion is above 98%.

The characteristics of the polybutadiene obtained at the outlet of the last reactor are reported in Table 2.

Example 3: Effect of the Process on the Permissible Initial Concentration of Monomer by Weight Example 3COMPAR: Synthesis of Polybutadiene with the Aforementioned Catalyst and Comparison of the Polymerization Conditions Polymerization of butadiene is carried out using a continuous polymerization process with 2 reactors of identical volume (14 L) arranged in series and each provided with a double jacket for cooling, the temperature of which is adjustable for controlling the polymerization temperature. The surface area of the double jacket is 0.32 m$^2$.

The second reactor is fed exclusively with the mixture leaving the first reactor.

The concentration of initial monomer by weight is increased progressively until it reaches the lower temperature limit of the double jacket (maximum cooling). This lower temperature limit is fixed at 5° C. The latter is reached at the level of the double jacket of the first reactor. The conditions of the operating point are given in Table 3.

TABLE 3

| | |
|---|---|
| Initial temperature of the mixture of solvent and monomer | 20° C. |
| Temperature of reactor No. 1 | 90° C. |
| Temperature of reactor No. 2 | 95° C. |
| Residence time in the first and in the second reactor | 20.6 min |
| Content of catalyst | 230 μmcm |
| Temperature of the double jacket of the first reactor | 5° C. |
| Temperature of the double jacket of the second reactor | 83° C. |
| Maximum initial concentration of monomer | 21.4% |
| Specific requirement for solvent (kg/kg of polymer) | 3.7 |

Conversion is above 98%.

Example 3INV: Synthesis of Polybutadiene with the Aforementioned Catalyst and Comparison of the Polymerization Conditions Polymerization of butadiene is carried out using a continuous polymerization process with 2 reactors of identical volume (14 L) arranged in series and each provided with a double jacket for cooling, the temperature of which is adjustable for controlling the polymerization temperature. The surface area of the double jacket is 0.32 m$^2$.

TABLE 2

| | POLYMERIZATION | | | CHARACTERISTICS OF THE POLYBUTADIENES OBTAINED | | | | |
|---|---|---|---|---|---|---|---|---|
| | Nd (μMcm) | Additional DIBAH (μMcm) | Number of reactors | ML (1 + 4) | Mn | PDI | Cis (%) | Cold Flow (g) |
| 2COMPAR | 226 | 351 | 3 | 43 | 203568 | 1.87 | 95.4% | 0.31 |
| | 231 | 351 | 2 | 36 | 184395 | 1.96 | 95.7% | 0.63 |
| 2INV | 219 | 350 | 3 | 40 | 197328 | 1.94 | 95.3% | 0.33 |
| | 228 | 352 | 2 | 33 | 178100 | 2.02 | 95.8% | 0.64 |

Examination of Table 2 clearly shows that, for one and the same number of reactors, the conventional process (2COMPAR) and the process with reinjection (2INV) allow synthesis of polybutadienes, which, for an equivalent Mooney value, have equivalent structural properties (PDI, % cis) and equivalent flow properties (cold flow).

A portion of the initial mixture of methylcyclohexane and butadiene is taken before it is mixed with the catalyst and with the additional DIBAH. This portion is injected in the second polymerization reactor directly. The weight ratio of the stream (solvent+butadiene) injected in the first reactor to the stream (solvent+butadiene) injected in the second reactor is 74%/26%, so that the residence time in the second reactor is identical to that in the second reactor in example 3COMPAR.

The second reactor is fed with this other portion of the mixture of methylcyclohexane and butadiene and with the mixture leaving the first reactor.

The concentration of initial monomer by weight is increased progressively until it reaches the lower temperature limit of the double jacket (maximum cooling). This lower temperature limit is fixed at 5° C. The latter is reached at the level of the double jacket of the first reactor. The conditions of the operating point are given in Table 4.

TABLE 4

| | |
|---|---|
| Initial temperature of the mixture of solvent and monomer entering the first reactor | 20° C. |
| Temperature of reactor No. 1 | 90° C. |
| Temperature of reactor No. 2 | 95° C. |
| Residence time in the second reactor | 20.6 min |
| Content of catalyst | 230 μmcm |
| Temperature of the double jacket of the first reactor | 5° C. |
| Temperature of the double jacket of the second reactor | 50° C. |
| Maximum initial concentration of monomer | 24% |
| Specific requirement for solvent (kg/kg of polymer) | 3.2 |

Conversion is above 98%.

Examination of Tables 3 and 4 clearly shows that for identical polymerization conditions (content of catalyst), changing the method makes it possible to increase the concentration of the monomers in the initial mixture. In fact, the temperature of 5° C. at the level of the double jacket of the first reactor is reached for a concentration of monomer by weight of 21.4% in the comparative method whereas with the method according to the invention the concentration of monomer by weight can be increased to 24%.

The process is thus more productive. It makes it possible to consume less solvent for one and the same amount of polymer produced. The relative reduction in weight of solvent in this example is about 14%.

The invention claimed is:

1. A continuous method for producing a diene elastomer, comprising a homopolymerization reaction of a catalytic system with a conjugated diene monomer to be polymerized in solution in a solvent, the catalytic system is based on at least:
 a rare earth organic salt;
 an alkylating agent; and,
 the polymerization reaction being conducted in at least two full polymerization reactors in series including a first polymerization reactor and a subsequent polymerization reactor which is subsequent to the first polymerization reactor, and a portion of the conjugated diene monomer to be polymerized is introduced into the subsequent polymerization reactor.

2. The continuous method according to claim 1, wherein a portion of the solvent is introduced with the conjugated diene monomer to be polymerized into the subsequent polymerization reactor.

3. The continuous method according to claim 1, wherein at least 20 wt %, relative to the total weight, of the conjugated diene monomer to be polymerized is introduced into a subsequent polymerization reactor.

4. The continuous method according to claim 1, wherein the portion of the conjugated diene monomer to be polymerized introduced into the subsequent polymerization reactor is at a temperature between −10° C. and 35° C.

5. The continuous method according to claim 1, wherein the method comprises the following simultaneous steps:
 a) introducing, into a first polymerization reactor, the solvent, all of the catalytic system, a portion of the conjugated diene monomer to be polymerized;
 b) polymerizing said diene monomer in said first polymerization reactor;
 c) introducing, into a second polymerization reactor, the solution resulting from step b) and the remainder of the conjugated diene monomer to be polymerized;
 d) polymerizing said diene monomer in said second polymerization reactor;
 e) optionally, introducing the solution resulting from step d) into a third polymerization reactor;
 f) optionally, polymerizing said diene monomer in said third polymerization reactor.

6. The continuous method according to claim 1, wherein the conjugated diene monomer to be polymerized and the solvent are introduced, into the first and/or subsequent polymerization reactor, at a temperature between −10° C. and 35° C.

7. The continuous method according to claim 1, wherein the method comprises the following simultaneous steps:
 a1) separating the incoming stream F comprising the solvent and all of the conjugated diene monomer to be polymerized into two streams F1 and F2;
 a2) introducing the catalytic system into a first polymerization reactor of stream F1;
 b) polymerizing said diene monomer continuously in said first polymerization reactor;
 c) injecting the solution resulting from step b) and stream F2 into a second reactor;
 d) polymerizing said diene monomer continuously in said second polymerization reactor;
 e) optionally, injecting the solution resulting from step d) into a third polymerization reactor;
 f) optionally, polymerizing said diene monomer continuously in said third polymerization reactor.

8. The continuous method according to claim 7, wherein at least stream F2 is at a temperature between −10° C. and 35° C.

9. The continuous method according to claim 1, wherein the concentration by weight of conjugated diene monomer to be polymerized is above 20%, relative to the total weight of conjugated diene monomer to be polymerized+solvent.

10. The continuous method according to claim 1, wherein the diene monomer to be polymerized is selected from butadiene and isoprene.

11. A continuous method for producing a diene elastomer, comprising a copolymerization reaction of a catalytic system with a mixture of monomers comprising at least one conjugated diene monomer to be polymerized in solution in a solvent, the catalytic system is based on at least:
 a rare earth organic salt;
 an alkylating agent; and,
 the polymerization reaction being conducted in at least two full polymerization reactors in series including a first polymerization reactor and a subsequent polymerization reactor which is subsequent to the first polymerization reactor, and a portion of each monomer to be polymerized is introduced into the subsequent polymerization reactor.

12. The continuous method according to claim 11, wherein a portion of the solvent is introduced with the conjugated diene monomer to be polymerized into the subsequent polymerization reactor.

13. The continuous method according to claim 11, wherein at least 20 wt %, relative to the total weight, of the conjugated diene monomer to be polymerized is introduced into a subsequent polymerization reactor.

14. The continuous method according to claim 11, wherein the portion of the conjugated diene monomer to be polymerized introduced into the subsequent polymerization reactor is at a temperature between 10° C. and 35° C.

15. The continuous method according to claim 11, wherein the method comprises the following simultaneous steps:
- a) introducing, into a first polymerization reactor, the solvent, all of the catalytic system, a portion of each monomer to be polymerized;
- b) polymerizing said monomers in said first polymerization reactor;
- c) introducing, into a second polymerization reactor, the solution resulting from step b) and the remainder of each monomer to be polymerized;
- d) polymerizing said monomers in said second polymerization reactor;
- e) optionally, introducing the solution resulting from step d) into a third polymerization reactor;
- f) optionally, polymerizing said monomers in said third polymerization reactor.

16. The continuous method according to claim 11, wherein the conjugated diene monomer to be polymerized and the solvent are introduced, into the first and/or subsequent polymerization reactor, at a temperature between −10° C. and 35° C.

17. The continuous method according to claim 11, wherein the method comprises the following simultaneous steps:
- a1) separating the incoming stream F comprising the solvent and all of the monomers to be polymerized into two streams F1 and F2;
- a2) introducing the catalytic system into a first polymerization reactor of stream F1;
- b) polymerizing said monomers continuously in said first polymerization reactor;
- c) injecting the solution resulting from step b) and stream F2 into a second reactor;
- d) polymerizing said monomers continuously in said second polymerization reactor;
- e) optionally, injecting the solution resulting from step d) into a third polymerization reactor;
- f) optionally, polymerizing said monomers continuously in said third polymerization reactor.

18. The continuous method according to claim 11, wherein at least stream F2 is at a temperature between −10° C. and 35° C.

19. The continuous method according to claim 11, wherein the concentration by weight of conjugated diene monomer to be polymerized is above 20%, relative to the total weight of conjugated diene monomer to be polymerized+solvent.

20. The continuous method according to claim 11, wherein the diene monomer to be polymerized is selected from butadiene, isoprene and mixtures thereof.

* * * * *